United States Patent [19]

White et al.

[11] Patent Number: 4,851,454

[45] Date of Patent: Jul. 25, 1989

[54] PHOTOLYTICALLY CROSSLINKABLE THERMALLY STABLE COMPOSITION

[75] Inventors: Jerry E. White; Lu Ho Tung; Mary K. Dehnke, all of Midland, Mich.

[73] Assignee: The Dow Chemical Company, Midland, Mich.

[21] Appl. No.: 115,650

[22] Filed: Oct. 26, 1987

Related U.S. Application Data

[63] Continuation of Ser. No. 886,476, Jul. 17, 1986, abandoned.

[51] Int. Cl.$^4$ ................................................ C08F 2/50
[52] U.S. Cl. .................................. 522/117; 522/116; 525/280; 525/282; 524/483; 430/270; 430/523; 430/950; 430/286; 430/283
[58] Field of Search ............... 522/116, 117; 525/280, 525/282

[56] References Cited

U.S. PATENT DOCUMENTS

| | | |
|---|---|---|
| 2,925,407 | 2/1960 | Goldberg . |
| 2,965,553 | 12/1960 | Dixon et al. .......................... 525/282 |
| 3,674,486 | 7/1972 | Milgrom . |
| 4,079,041 | 3/1978 | Baumann et al. . |
| 4,158,730 | 6/1979 | Baumann et al. . |
| 4,158,731 | 6/1979 | Baumann et al. . |
| 4,163,097 | 7/1979 | Baumann et al. . |
| 4,266,005 | 5/1981 | Nakamosa et al. ................ 522/116 |
| 4,323,662 | 4/1982 | Oba et al. ............................ 525/282 |
| 4,585,876 | 4/1986 | Fischer et al. . |
| 4,615,968 | 10/1986 | Berger et al. . |
| 4,677,047 | 6/1987 | Berger et al. ....................... 522/117 |

FOREIGN PATENT DOCUMENTS

| | | |
|---|---|---|
| 738500 | 12/1966 | Canada . |
| 60-98245 | 8/1981 | Japan ................................. 525/282 |

OTHER PUBLICATIONS

J. Poly. Sci. Part A-1, 10, 1687-1699 (1972).

Primary Examiner—Melvyn I. Marquis
Assistant Examiner—David W. Woodward
Attorney, Agent, or Firm—Douglas N. Deline

[57] ABSTRACT

Photolytically crosslinkable thermally stable compositions comprising at least one crosslinkable polymer and a crosslinkable quantity of a multifunctional 3,4-disubstituted maleimide. The compositions may be employed to prepare adhesives and photo printing mats.

10 Claims, No Drawings

PHOTOLYTICALLY CROSSLINKABLE THERMALLY STABLE COMPOSITION

CROSS-REFERENCE TO RELATED APPLICATION

This is a continuation of application Ser. No. 886,476 filed July 17, 1986, now abandoned.

BACKGROUND OF THE INVENTION

The present invention relates to photolytically crosslinkable compositions. More particularly, the present invention relates to such compositions which are photolytically crosslinkable but are thermally stable, that is, not readily subject to crosslinking or vulcanization reactions at temperatures normally encountered under processing conditions. Such compositions find utility as adhesives particularly when blended with tackifiers. In addition, such compositions may be employed to prepare photo printing mats, wherein selective exposure to light results in crosslinking of the composition thereby imparting solvent resistance whereas unexposed and uncrosslinked layers not having such solvent resistance may be later removed during the developing process thereby achieving a flexible surface suitable for printing. In addition, the compositions of the invention may be employed in other suitable applications such as photo resists, photo masking and other applications.

In Canadian Pat. No. 738,500; an ethylene bismaleimide and an N,N'-meta phenylene bismaleimide are disclosed for use as vulcanizing agents in the crosslinking of various unsaturated rubbers including homopolymers and heteropolymers of conjugated dienes, e.g., polybutadiene and butadiene/styrene copolymers, and polyurethane rubbers. Such vulcanizing agents were thermally activated.

In U.S. Pat. No. 3,674,486, photoresist materials comprising a photosensitizer, a crosslinking agent and a rubber-like constituent are disclosed. Suitable crosslinking agents disclosed included multifunctional olefins, such as triallyl cyanurate, pentaerthritol triacrylate, and polyvinyl cinnamate. For the teachings therein, this reference is hereby incorporated in its entirety by reference thereto.

In U.S. Pat. Nos. 4,079,041, 4,163,097, 4,158,730 and 4,158,731 there are disclosed certain organic polymers which can be crosslinked under the action of light having a molecular weight of at least 1,000 and containing as light sensitive groups di-substituted maleimide functionality. The teachings of such patents are also incorporated in their entirety herein by reference thereto.

In U.S. Pat. No. 2,925,407, the curing of high molecular weight substantially unsaturated polymers by the use of free-radical generators such as organic peroxide and free-radical exceptors such as bismaleimide compounds, among others, is disclosed. Such curing operation is thermally activated.

Despite advances in the art utilizing photolytically active curing agents, there remains a desire to prepare compositions that may be photolytically crosslinked but are insensitive to curing prematurely under the action of heat. Compositions which are not thermally stable as previously described, cannot easily be employed in thermal processing operations such as melt extrusion, extrusion coating, melt mixing and other high temperature processes. Alternative techniques such as solvent deposition or other suitable technique must be employed to manufacture and apply thermally sensitive compositions. However, solvents are both expensive and undesirable from the standpoint of atmospheric emissions and combustion hazard. Moreover, thermally unstable compositions and materials prepared therefrom must be subsequently treated in a manner so as to minimize the effects of thermal crosslinking. For example, printing plates that are subject to thermal crosslinking should be maintained at reduced temperatures in order to impart practical lifetimes. Finally, current adhesives used in the preparation of masking tapes and other adhesive products are normally deposited onto a paper stock by solvent casting. The compositions are then partially crosslinked through the use of sulfur vulcanizing agents. This procedure is both cumbersome and difficult to control in a manner to give uniform product properties. Such compositions may also require a paper stock which has been previously pretreated by the use of reactive primers.

It would be desirable to provide a composition which is photolytically crosslinkable but thermally stable which may be prepared, processed, and applied using standard thermal processing techniques.

It would be desirable to provide a composition which is photolytically crosslinkable but thermally stable and which reduces or eliminates the need to use solvents in its preparation or application.

SUMMARY OF THE INVENTION

According to the present invention there is provided a photolytically crosslinkable but thermally stable composition comprising at least one crosslinkable polymer and a crosslinkable quantity of a multifunctional 3,4-disubstituted maleimide compound corresponding to the formula:

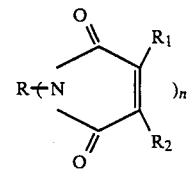

wherein R is a n-valent aliphatic moiety containing up to 36 carbons; $R_1$ and $R_2$ independently each occurrence are alkyl, cycloalkyl or aryl of up to 12 carbons, or $R_1$ and $R_2$ conjointly denote the remaining part of a 5 or 6 membered carbocyclic ring, or substituted carbocyclic ring which is saturated except as characterized in the maleimido group and contains up to a total of 12 carbons; and n is 1, 2, 3 or 4.

DETAILED DESCRIPTION OF THE INVENTION

Crosslinkable polymers suitable for use according to the present invention include any composition which is reactive with the above described multifunctional 3,4-disubstituted maleimide under photolytic reaction conditions to provide crosslinked polymer structures. Examples include homopolymers and interpolymers of one or more olefinic or diolefinic monomers. Preferred crosslinkable polymers are those containing residual unsaturation. Highly preferred crosslinkable polymers include elastomeric resin materials containing ethylenic unsaturation which are thermally stable in the absence of a crosslinker. Particularly preferred elastomeric resin materials include homopolymers and copolymers of conjugated dienes such as isoprene or butadiene, especially block or random copolymers of such conjugated dienes with one or more copolymerizable monovinylidene aromatic comonomers. Specific examples include the well known copolymers of butadiene or isoprene with styrene or mixtures of styrene and α-methylstyrene. Also included are additional elastomeric resin materials such as butyl rubbers, copolymers of ethylene and propylene, interpolymers of ethylene, propylene and a non-conjugated diene, acrylate rubbers, and hydrogenated homopolymers and copolymers of conjugated dienes.

The multifunctional 3,4-disubstituted maleimide compounds preferred for use according to the present invention are characterized by a high degree of solubility in the crosslinkable polymer and in any additional components employed in the present composition and by being thermally stable. Preferably such compositions are completely miscible in the crosslinkable polymer or soluble to a degree such that a crosslinkable quantity thereof may be dissolved in the crosslinkable polymer. Most preferably, the maleimide substituted crosslinking agents are soluble in the crosslinkable polymer to the extent of at least about 0.01 grams per gram of crosslinkable polymer.

By the term "thermally stable" is meant that the maleimide containing composition of the present invention retains the practical ability to suitably flow under the melt processing conditions after exposure to a temperature of 200° C. for ten minutes. Practically such flow should be at least about a melt flow rate of 1.0 as measured by the American Society of Testing Materials (ASTM) method D 1238 Schedule G. Preferably, such compositions retain at least about 90 percent of their crosslinking ability on a weight basis after such exposure. In determining the percentage crosslinking ability remaining, the unreacted crosslinker may be extracted or merely analyzed by infrared or other technique and the ratio of remaining unreacted crosslinker calculated.

Curing or crosslinking of the composition of the invention may be initiated by the use of radiation of any suitable wavelength. It is generally desirable that the maleimide substituted crosslinking agent be photolytically active upon exposure to electro-magnetic radiation of a wavelength between about 180 and about 1000 nanometers. Accordingly, curing of the compositions is generally conducted in such wavelength range.

Amongst the photolytically active maleimide substituted crosslinking agents, it has been generally observed that greater activity may be obtained by a specific selection of particular divalent aliphatic moieties represented by R in formula I. Particularly preferred divalent aliphatic moieties include alkylenes having at least 8 carbons separating the respective covalent bonds. By the term "aliphatic" is included the saturated derivatives of alkanes, ethers, thioethers, polyethers, etc. For example, suitable R groups include the following non-exclusive list:

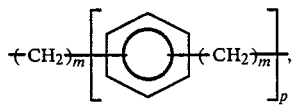

wherein m and p independently each occurrence are integers, R' is hydrogen or $C_1$–$C_6$ alkyl and $R_1$ and n are as previously defined.

In addition to the above components, the photolytically crosslinkable but thermally stable composition of the present invention may additionally comprise components especially adapted to provide desired end use properties. For example, a photosensitizer such as thioxanthones, quinones or other sensitizers may be employed to provide greater sensitivity to electromagnetic radiation.

In the embodiment of the present invention employed as an adhesive composition, additional well known components to adhesive formulations such as tackifiers may be employed. Preferred tackifiers are resins or plasticizers such as polyterpene resins, terpene-phenol resins, rosin esters, as well as piperylene derivatives or other petroleum derived tackifiers, and polymeric tackifiers derived from styrene or α-methylstyrene. A particularly preferred tackifer capable of use to prepare a two component photolytically crosslinkable composition of exceptional photolytic activity is a saturated polymer of a $C_5$ petroleum distillation stream eg. a polymer of piperylene. Additional, suitable components include flow-aids, anti-blocking aids, extenders, fillers, anti-oxidants, solvents, etc.

Suitably, tackifiers may be employed in sufficient amounts so as to provide up to a 50 percent gel content in the desired formation after photolytic crosslinking. Amounts of such tackifier may be on the order of up to 70 percent by weight of the composition formulation. The amount of crosslinkable polymer or polymers and multifunctional 3,4-disubstituted maleimide compounds employed are selected to provide the desired amount of crosslinking properties. Preferably, based on crosslinkable polymer weight from about 0.01 percent to about 10 percent of the 3,4-disubstituted maleimide compound is employed. Additional components are employed in amounts suitable to achieve the desired purpose as is well known in the art.

In the embodiment specifically adapted to the preparation and use as a photoresist material or a printing mat, the composition of the invention may be coated, extruded or otherwise formed into a thin sheet optionally in combination with a suitable substrate or backing material such as a polymeric, cellulosic or metallic substrate. The desired selective exposure to electromagnetic radiation, specifically light, may be obtained by any suitable technique such as blocking off of areas thereof to be unexposed, or the use of standard photographic techniques such as a negative interlayer or laser imaging.

In addition to the previously identified benefits achieved by melt processing of the present invention, the present compositions enjoy improvements in odor reduction and ease of product handling and formulation due to the powdery nature of the 3,4-disubstituted maleimide crosslinking agent employed therein.

SPECIFIC EMBODIMENTS

Having described the invention, the following examples are provided as further illustrative and are not to be construed as limiting.

EXAMPLE 1

30 Grams of a commercially available styrene-isoprene-styrene triblock copolymer (Kraton ® 1107 available from Shell Chemical Company) is dissolved in 30 milliliters of methylene chloride along with 0.6 grams of N,N'-bis(dimethylmaleimido)hexane (prepared as described by F. C. DeSchryver, et al., J.

Polym. Sci., Part A-1, Volume 10, Page 1687 (1972)). The solution is then evaporated under vacuum to dryness. The melt flow rate of the mixture is 9.9 as measured according to ASTM Method D 1238 Schedule G.

The resulting resin is exposed to a temperature of 200° C. for 20 minutes. After cooling, the melt flow rate measured by the above technique increased to 10.9, thereby indicating that the composition possessed suitable thermal stability. Sheets approximately 0.2 millimeters in thickness are compression molded at 180° C. Unmodified samples of Kraton ® 1107 are similarly prepared. Both samples are irradiated on one surface only with an unfocused, unfiltered 450 W Hanovia lamp at a distance of 7 centimeters. Gel fractions are determined after exposure by extraction with methylene chloride for 24 hours. Results are contained in Table 1.

TABLE I

| Irradiation | wt. % Gel | |
| Time (sec) | blend | unmodified |
| --- | --- | --- |
| 0 | 0 | 0 |
| 60 | 2.3 | — |
| 120 | 4.6 | 0.9 |
| 360 | 46.7 | 1.1 |
| 480 | — | 3.9 |

Example 2

30 Grams of a tapered styrene-butadiene-styrene triblock containing about 61.4 percent butadiene having a number average molecular weight as determined by gel permeation chromatography of about 62,200 are dissolved of 30 milliliters of methylene chloride. 0.6 Grams of N,N'-bis(dimethylmaleimido)hexane is added. The solution is then evaporated to dryness in a vacuum and the resulting mixture having a melt flow rate of 57 as measured according to the technique of Example 1 is recovered. After exposure for 20 minutes to a temperature of 200° C., the composition has a melt flow rate of 40, thereby indicating a thermally stable composition.

Compression molded samples approximately 0.25 millimeters in thickness are prepared and irradiated as in Example 1. Gel fractions are determined according to the techniques of Example 1. Results are contained in Table II.

TABLE II

| Irradiation | wt. % Gel | |
| Time (sec) | blend | unmodified |
| --- | --- | --- |
| 0 | 0 | 0 |
| 30 | 7.3 | 2.5 |
| 60 | 10.8 | 3.0 |
| 120 | 37.0 | 5.4 |
| 240 | 72.5 | 7.1 |

Example 3

The procedures of Example 1 are substantially repeated employing as a photo-crosslinker 1 weight percent N,N'-bis(3,4-dimethylmaleimido)-decane. Films approximately 0.2 millimeters in thickness are irradiated at 7 centimeters from an unfocused, unfiltered 450-W Hanovia lamp. Insoluble portions (percent gel) of photolyzed specimens after extraction with methylene chloride for 24 hours at room temperature are provided in Table III.

TABLE III

| Irradiation Time (sec) | wt. % gel |
| --- | --- |
| 30 | 3.5 |
| 60 | 7.7 |
| 120 | 26.5 |
| 240 | 76.9 |

EXAMPLE 4

Tackified blends containing photolytic, crosslinking agents according to the present invention are prepared and tested substantially according to the procedure of Example 1. Accordingly, 1:1 weight blends of Kraton ® 1107 brand block copolymer and REGALREZ ® 1094 brand tackifier resin containing the weight percentage and type of photolytically active crosslinkers further indicated in Table IV are prepared and cast from toluene into 0.4 mm thick coatings on quick release paper (type C-60564 available from Kimberly Clark Corp.). REGALREZ ® 1094 is a hydrogenated terpene base oligomeric tackifier available from Hercules Inc. The samples are irradiated under a nitrogen atmosphere inside a closed container equipped with a quartz window at the focal-point of a porta-cure model 1,500 F ultraviolet lamp, equipped with a model PC-1521 source. Percent gel fractions are determined as in Example 1. Crosslinking agents, amounts, irradiation times and results are contained in Table IV.

TABLE IV

| Irradiation | wt % gel photocrosslinker (wt %) | | |
| Time (sec) | A (2.5) | B (2.7) | C (2.5) |
| --- | --- | --- | --- |
| 1 | 21.2 | 31.5 | 17.0 |
| 2 | 48.3 | 44.4 | 41.7 |
| 4 | 53.6 | 53.8 | 51.4 |

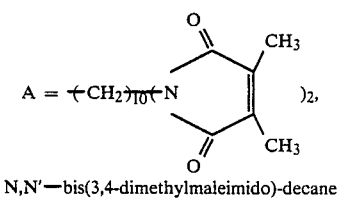

N,N'—bis(3,4-dimethylmaleimido)-decane

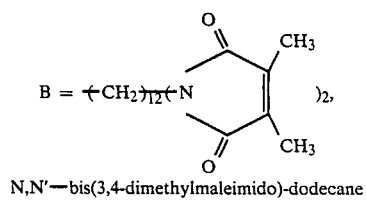

N,N'—bis(3,4-dimethylmaleimido)-dodecane

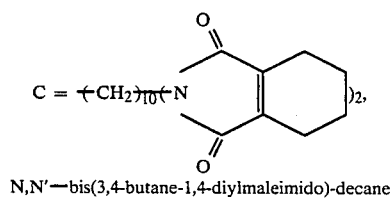

N,N'—bis(3,4-butane-1,4-diylmaleimido)-decane

EXAMPLE 5

Additional samples of adhesive formulations that possess suitable pressure sensitive adhesive properties are prepared and tested for photolytic crosslinking properties. Accordingly Kraton ® 1107 brand block copolymer (10 grams) is combined with a mixture of partially unsaturated terpene based tackifiers Wingtack ® 95 (7.0 grams) and Wingtack ® 10 (5.2 grams). Both tackifiers are available from Goodyear Chemical Co. Composition 1 further contains N,N'-bis(3,4-dimethylmaleimido)decane (2.5 weight percent). Composition 2 further contains N,N'-bis(3,4-dimethylmaleimido)decane (2.5 weight percent) and thioxanthone photosensitizer (0.6 weight percent). Composition 3 further contains only thioxanthone. Thin films (0.4 mm) are solvent cast onto release agent coated paper, irradiated and tested for gel content as in Example 4. Results are contained in Table V.

TABLE V

| Irradiation Time (sec) | wt. % Gel | | |
|---|---|---|---|
| | Comp. 1 | Comp. 2 | Comp. 3 |
| 1 | 9.1 | 36.6 | 2.4 |
| 2 | 25.0 | 44.9 | 5.9 |
| 3 | — | 47.7 | 9.4 |
| 4 | 44.0 | 50.0 | 5.1 |
| 6 | 47.5 | 50.0 | 10.9 |

The results indicate essentially complete crosslinking of the available crosslinkable resin utilizing the combination crosslinker and photosensitizer in reduced exposure time compared to use of the crosslinker alone. Also the results indicate that the photosensitizer itself is not capable of causing appreciable crosslinking in the reaction times studied. Gel formation is considered to be a favorable indication that initial attachment of the adhesive formulation to a substrate such as those employed in preparing masking tapes by photocrosslinking is possible.

Example 6

Pressure sensitive adhesive formulations having the parts by weight of components in Table VI are prepared and then dissolved in toluene (50 percent solids). Films are then cast on crepe stocks (Kimberly-Clark, type C-60564) using a 10-mil Bird bar. The solvent is allowed to evaporate at room temperature for one hour and the resulting tape samples are heated at 90° C. for 4 minutes. Final thickness of the pressure sensitive adhesive film deposit prepared in this manner is about 0.4 mm. The specimens are cut into 1×4" strips and irradiated for 4 sec. substantially according to the technique of Example 4. Peel tests (180°) for cured and uncured tapes are then determined according to Specification 1 of the Pressure Sensitive Tape Council (PSTC-1) at 73° F. (23° C.), 50 percent relative humidity, employing a dwell time less than or equal to one minute on the test plate. Results are listed in Table VII.

TABLE VI

| | Formulation No. | | | | |
|---|---|---|---|---|---|
| Component | 1 | 2 | 3 | 4 | 5 |
| Block copolymer[1] | 10.0 | 10.0 | — | 10.0 | — |
| Block copolymer[2] | — | — | 10.0 | — | 10.0 |
| Tackifier 1[3] | 7.0 | 7.0 | 7.0 | 7.0 | 7.0 |
| Tackifier 2[4] | 5.2 | 5.2 | 5.2 | 5.2 | 5.2 |
| Antioxidant[5] | 0.1 | — | — | 0.1 | 0.1 |

TABLE VI-continued

| | Formulation No. | | | | |
|---|---|---|---|---|---|
| Component | 1 | 2 | 3 | 4 | 5 |
| Photocrosslinker[6] | — | 0.56 | 0.56 | 0.56 | 0.56 |

[1]Kraton ® 1107 available from Shell Chemical Company.
[2]Styrene/α-methylstyrene-isoprene-styrene/α-methylstyrene containing 81.0 percent by weight isoprene, 11.4 percent α-methylstyrene and 7.6 percent styrene prepared at a polymerization temperature of about 70° C.
[3]Wingtack ® 95 available from Goodyear Rubber Company.
[4]Wingtack ® 10 available from Goodyear Rubber Company.
[5]Irganox 1010 available from Ciba Giegy Corporation.
[6]N,N'—bis(3,4-dimethylmaleimido)-decane.

TABLE VII

| | 180° Peel Adhesion (oz/linear inch) | |
|---|---|---|
| Formulation No. | Unirradiated | after 4 rec. of irradiation |
| 1 | 44 | 48 |
| 2 | 24 | 19 |
| 3 | 40 | 19 |
| 4 | 24 | 19 |
| 5 | 40 | 20 |

The reduction in peel adhesion of formulations 2–5 indicates gellation of the crosslinkable resin has occurred providing attachment of the adhesive film to the crepe stock. Remaining adhesiveness is provided by the tackifier.

"Ghosting" tests to indicate separation of the adhesive from the crepe stock are performed on the above prepared tape samples in the following manner. Samples of both irradiated and unirradiated tapes are applied to a clean photographic ferrotype drying plate with a 4.5 lb roller as specified by PSTC-1. The plate with attached tapes is heated at 130° C. for 45 min. The tapes are then peeled from the plate while still hot (130° C.) at angles of 90° and 180° to the plate. Additional samples of the tapes are peeled from the plate after the assembly is allowed to cool to room temperature. Tapes pass the "ghosting" test if no residue remains on the test plate. Results are shown in Table VIII.

TABLE VIII

| | Irradiation | Results | |
|---|---|---|---|
| Formulation | Time, Sec. | Room Temp. | 130° C. |
| 1 | 0 | Fail | Fail |
| 1 | 4 | Fail | Fail |
| 2 | 0 | Pass | Fail |
| 2 | 4 | Pass | Pass |
| 3 | 0 | Pass | Fail |
| 3 | 4 | Pass | Pass |
| 4 | 0 | Pass | Fail |
| 4 | 4 | Pass | Pass |
| 5 | 0 | Pass | Fail |
| 5 | 4 | Pass | Pass |

In all cases, it is seen that photocrosslinked films of the present invention possess good, high temperature "ghosting" properties indicating integrity and continuity to the deposited cured adhesive film and good adhesion to the substrate.

Example 7

Pressure sensitive adhesive tapes prepared and irradiated as outlined in Example 6 are immersed in toluene for 24 hours. Cured adhesive films according to the invention containing a photocrosslinker produce a swollen gel which remains tightly bound to the crepe paper substrate. Removal of the gel requires mechanical separation with a spatula or razor blade. Adhesive films not containing a photolytically active crosslinker dissolve in the toluene.

What is claimed is:

1. A photolytically crosslinkable but thermally stable composition comprising at least one crosslinkable interpolymer of one or more olefinic or diolefinic monomers and one or more copolymerizable monovinylidene aromatic comonomers said interpolymer containing residual unsaturation and a crosslinkable quantity of a multifunctional 3,4-disubstituted maleimide compound corresponding to the formula:

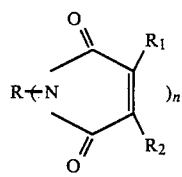

wherein R is a n-valent aliphatic moiety containing up to 36 carbons; $R_1$ and $R_2$ independently each occurrence are alkyl, cycloalkyl or aryl of up to 12 carbons, or $R_1$ and $R_2$ conjointly denote the remaining part of a 5 or 6 membered carbocylic ring, or substituted carbocylic ring which is saturated except as characterized in the maleimido group and containing up to a total of 12 carbons; and n is 2, 3, or 4.

2. A composition according to claim 1, wherein the crosslinkable interpolymer is a random copolymer or block copolymer of butadiene or isoprene with one or more copolymerizable monovinylidene aromatic comonomers.

3. A composition according to claim 1, wherein the crosslinkable interpolymer comprises a block copolymer of isoprene or butadiene with styrene or a mixture of styrene and α-methylstyrene.

4. A composition according to claim 1, wherein in the 3,4-disubstituted maleimide compound R is alkylene having at least 8 carbons separating the covalent bonds.

5. A composition according to claim 1, wherein the 3,4-disubstituted maleimide is:

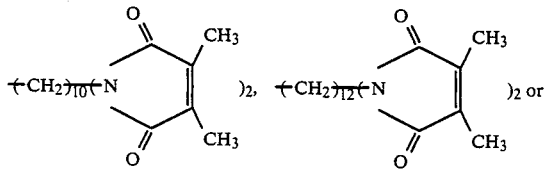

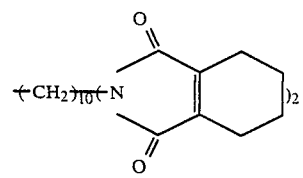

6. A composition according to claim 1, additionally comprising a tackifier.

7. A composition according to claim 6, wherein the tackifier is a saturated piperylene polymer.

8. A photo printing mat comprising a composition according to claim 1.

9. A composition according to claim 1, wherein R corresponds to the formula:

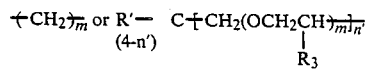

wherein m and p are independently each occurrence integers, R' is hydrogen or $C_{1-6}$ alkyl, $R_3$ is alkyl or cycloalkyl of up to 12 carbons and n' is 1, 2, 3 or 4.

10. An adhesive comprising
   1. an interpolymer of one or more olefinic or diolefinic monomers said interpolymer containing residual unsaturation;
   2. a crosslinkable quantity of a multifunctional 3,4-disubstituted maleimide compound corresponding to the formula:

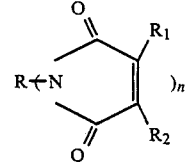

wherein R is a n-valent aliphatic moiety containing up to 36 carbons; $R_1$ and $R_2$ independently each occurrence are alkyl, cycloalkyl or aryl of up to 12 carbons, or $R_1$ and $R_2$ conjointly denote the remaining part of a 5 or 6 membered carbocyclic ring, or substituted carbocyclic ring which is saturated except as characterized in the maleimido group and containing up to a total of 12 carbons; and
   3. a tackifier.

* * * * *

UNITED STATES PATENT AND TRADEMARK OFFICE
CERTIFICATE OF CORRECTION

PATENT NO. : 4,851,454

DATED : July 25, 1989

INVENTOR(S) : Jerry E. White, Lu Ho Tung and Mary K. Dehnke

It is certified that error appears in the above-identified patent and that said Letters Patent is hereby corrected as shown below:

Column 3, line 63, delete " 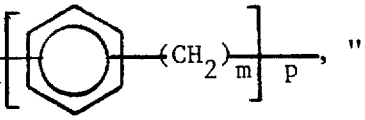 "

insert therefore $\{CH_2\}_m$, or $R'_{(4-n)} -C\{CH_2(OCH_2CH)_m\}_n$
$\qquad\qquad\qquad\qquad\qquad\qquad R_1$ Column 3, line 66, delete "and p".

Column 3, line 66, "are integers" should correctly appear as --is an integer--.

Column 10, line 24, delete "and p are".

Column 10, line 24, "occurrence" should correctly appear as --occurrence is an--.

Column 10, line 25, "integers," should correctly appear as --integer--.

Signed and Sealed this

Twenty-eighth Day of August, 1990

Attest:

HARRY F. MANBECK, JR.

*Attesting Officer*      *Commissioner of Patents and Trademarks*